(12) United States Patent
Derksema et al.

(10) Patent No.: US 8,619,403 B2
(45) Date of Patent: Dec. 31, 2013

(54) DRIVE DEVICE FOR APPLYING A MAGNETIC PULSE TO A MECHANICAL ASSEMBLY AND AIRCRAFT LOAD EJECTION DEVICE IMPLEMENTING SAME

(75) Inventors: Jean-Jacques Derksema, Saint Quentin les Beaurepaire (FR); Klaus Sterzelmeier, Müllheim/Feldberg (DE)

(73) Assignees: Alkan, Valenton (FR); Institut Franco-Allemand de Recherches de Saint-Louis, Saint-Louis (FR)

( * ) Notice: Subject to any disclaimer, the term of this patent is extended or adjusted under 35 U.S.C. 154(b) by 474 days.

(21) Appl. No.: 12/674,411

(22) PCT Filed: Aug. 22, 2008

(86) PCT No.: PCT/FR2008/051520
§ 371 (c)(1),
(2), (4) Date: Jul. 13, 2011

(87) PCT Pub. No.: WO2009/024733
PCT Pub. Date: Feb. 26, 2009

(65) Prior Publication Data
US 2011/0284695 A1  Nov. 24, 2011

(30) Foreign Application Priority Data
Aug. 23, 2007 (FR) .................................... 07 57138

(51) Int. Cl.
*H01H 47/00* (2006.01)
(52) U.S. Cl.
USPC ........................................................ 361/143
(58) Field of Classification Search
USPC ........................................................ 361/143
See application file for complete search history.

(56) References Cited

U.S. PATENT DOCUMENTS

| 4,590,411 A | * | 5/1986 | Kelly | ............................ 318/687 |
| 4,965,864 A | * | 10/1990 | Roth et al. | .................... 318/135 |

FOREIGN PATENT DOCUMENTS

| EP | 0 788 853 | 8/1997 |
| FR | 2 876 796 | 4/2006 |
| GB | 190120935 | 0/1902 |
| WO | 99/19972 | 4/1999 |

OTHER PUBLICATIONS

International Search Report dated Feb. 19, 2009, with English Translation.

* cited by examiner

*Primary Examiner* — Stephen W Jackson
(74) *Attorney, Agent, or Firm* — Dickinson Wright PLLC

(57) ABSTRACT

This device comprises an electromagnetic coil (3) in which there is able to slide a piston (6) which has at least a portion made of a material having paramagnetic susceptibility and which is placed in contact with the mechanical member when the drive device (1) is in the rest state.

Electrical energy supply means are provided in order to store electrical energy and to abruptly release this energy into the coil and thus apply the high-energy magnetic movement pulse to the mechanical member.

According to the invention, the piston (1) comprises a stack (9) of blocks (11, 12) which are made alternately from the material having paramagnetic susceptibility and an insulating material; and the electrical energy supply means are provided in order to allow the energy to be applied to the coil in the form of a series of electrical pulses which appear as the piston (6) moves.

10 Claims, 6 Drawing Sheets

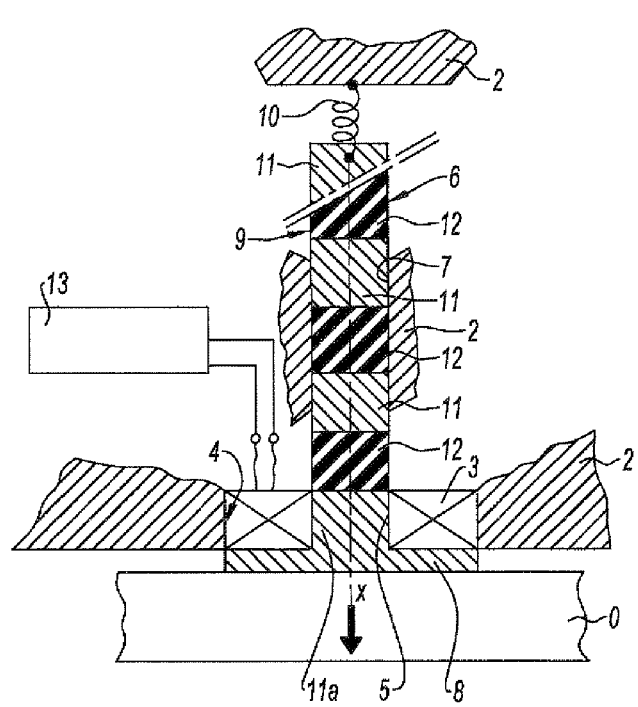
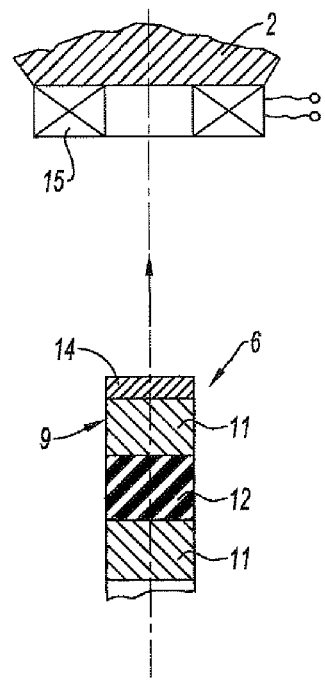
Fig. 1    Fig. 1A
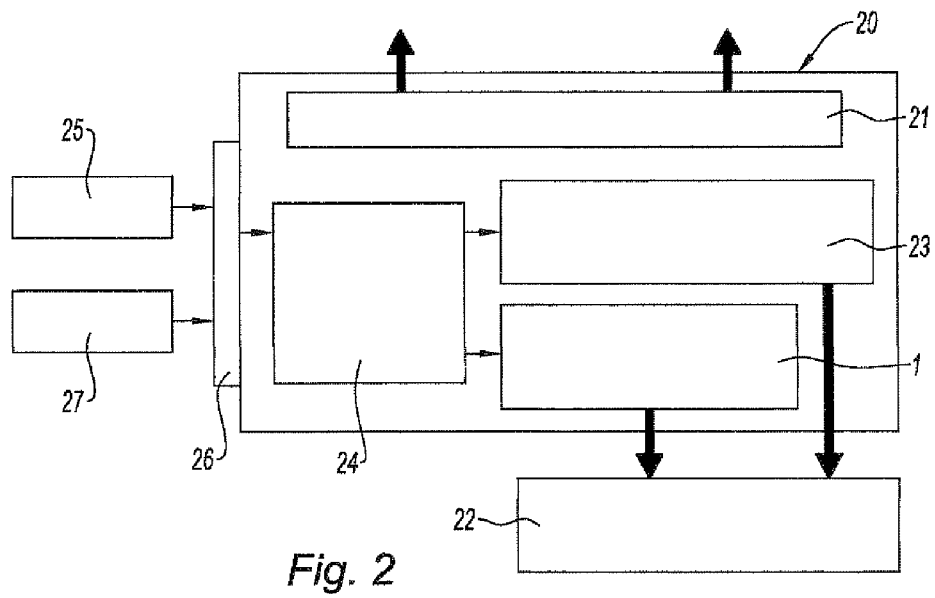
Fig. 2

DRIVE DEVICE FOR APPLYING A MAGNETIC PULSE TO A MECHANICAL ASSEMBLY AND AIRCRAFT LOAD EJECTION DEVICE IMPLEMENTING SAME

The present invention relates to a drive device which is intended to apply a high-energy movement pulse to a mechanical member. More specifically, the invention relates to devices of this type in which the energy applied is of the electromagnetic type.

In various fields of technology, it may be necessary to be able to apply a very high-energy pulse to a mechanical member in a controlled manner. It is possible to mention by way of example of such fields, basic research on materials with regard to their behaviour in the event of a violent impact or avionics, a field in which it may be necessary to very abruptly separate from a wing of an aircraft a load such as a missile which is suspended on a support which is fixed to this wing. However, it should be noted that the invention is not limited to either of these two fields, it being possible to use it in all cases in which it is necessary to be able to have a high-energy mechanical pulse which is capable of being conferred on a mechanical member.

Document FR 2 876 796 describes a device of the type indicated above used in the first technical field set out above. This involves bringing about a violent collision between two samples of material which it is desirable to examine. One of the embodiments of the device described in this document comprises for each sample a cylindrical coil in the cylindrical cavity of which there slides axially a piston of an electrically conductive material which forms an item of equipment which is movable with the sample concerned. The cylindrical coils are connected electrically in a circuit which comprises a capacitor with a high energy capacity and a switch which, at the desired time, allows the capacitance to be discharged into the coils in order to bring about therein a current which allows Foucault currents to be induced in the piston. Consequently, there is produced between each coil and the piston in question a repellent force which projects the corresponding sample towards the other sample in order to bring about the desired collision.

It is indicated in the above-mentioned document that the embodiment analysed above which therefore comprises coils of cylindrical form with pistons which slide in their central cavity allows an acceleration distance to be achieved which is the highest amongst those which can be achieved with the various embodiments described. In some applications, however, even this high acceleration distance is not sufficient and this is particularly the case in the application set out above in the field of avionics.

It is also found in this specific field of application that the repellent force between the device and the member to be moved is also not powerful enough particularly owing to the high masses which are intended to be subjected to kinetic forces.

The object of the invention is therefore to provide a device of the above-mentioned type which allows a higher acceleration distance and repellent force to be achieved, which it is not possible to achieve with the device described in the above-mentioned document from the prior art.

The invention therefore relates to a drive device which is intended to apply a high-energy magnetic movement pulse to a mechanical member in order to apply acceleration thereto, comprising:

a mounting, at least one electromagnetic coil which is fixed in this mounting and which has an axis of revolution and a central passage which is centered relative to this axis, a piston which has at least a portion made of a material having paramagnetic susceptibility, the piston being mounted in a sliding manner in the passage and placed in contact with the mechanical member when the drive device is in the rest state, and electrical energy supply means for the coil, which means are provided in order to store electrical energy and to abruptly release this energy into the coil and thus apply the high-energy magnetic movement pulse to the mechanical member, characterised in that the piston comprises a stack of blocks having a peripheral shape which is adapted to that of the passage, the blocks in the stack being made alternately from the material having paramagnetic susceptibility and an insulating material; and in that the electrical energy supply means are provided in order to allow the energy to be applied to the coil in the form of a series of electrical pulses which appear as the piston moves.

Owing to these features, the drive device behaves in the manner of a step motor, the acceleration power of the object to be moved being able to be obtained by the accumulation of movement energy obtained at each step by the release of electrical energy into the coil. It is thus possible to produce a movement pulse of great power with significant acceleration.

According to other advantageous features of the invention:
the material having paramagnetic susceptibility is of the electrically conductive type;
a pushing member, for example, in the form of a plate, is fixedly joined to the stack of blocks and interposed between the stack and the mechanical member when the drive device is in the rest position;
it comprises a return means in order to return the piston into the initial position thereof after the movement pulse applied to the mechanical member is complete;
the return means may comprise a resilient return element which is formed by at least one spring which is tensioned between the mounting and the rear end of the piston;
in a variant, the return means may also comprise a plate of ferromagnetic material which is fixed to the rear end of the piston and an electromagnetic coil which is provided on the mounting and which is intended, when it is excited, to attract the plate in order to return the piston to its initial position;
in a variant, it may also comprise at least two electromagnetic coils which are aligned axially relative to the axis and through which the piston extends, and the electrical energy supply means may comprise for each of the coils a supply section which is provided in order to store electrical energy and to abruptly release this energy into the associated coil, the electrical pulses being applied by these sections in a predetermined order of sequence;
the coils are superimposed one on the other or are spaced-apart from each other by a distance corresponding to at least a height of the blocks;
the electrical energy supply means comprise at least one capacitor for storing the electrical energy and semi-conductive control means to release this energy at the correct time during the ejection process.

The invention also relates, as an application of the invention, to an ejection device for an aircraft load which comprises a drive device as defined above and whose piston, prior to the take-off of the load from the aircraft, is in contact with the load thus forming the mechanical object in order to be subjected to the high-energy movement pulse, the electrical energy supply means being connected to the control systems of the load of the aircraft in order to be triggered at the time when the take-off of the load must be initiated.

The invention is described in greater detail with reference to embodiments and the drawings, in which:

FIG. 1 is a schematic sectioned view of a drive device according to the invention;

FIG. 1A is a partial view of a variant of this drive device;

Figure 5:
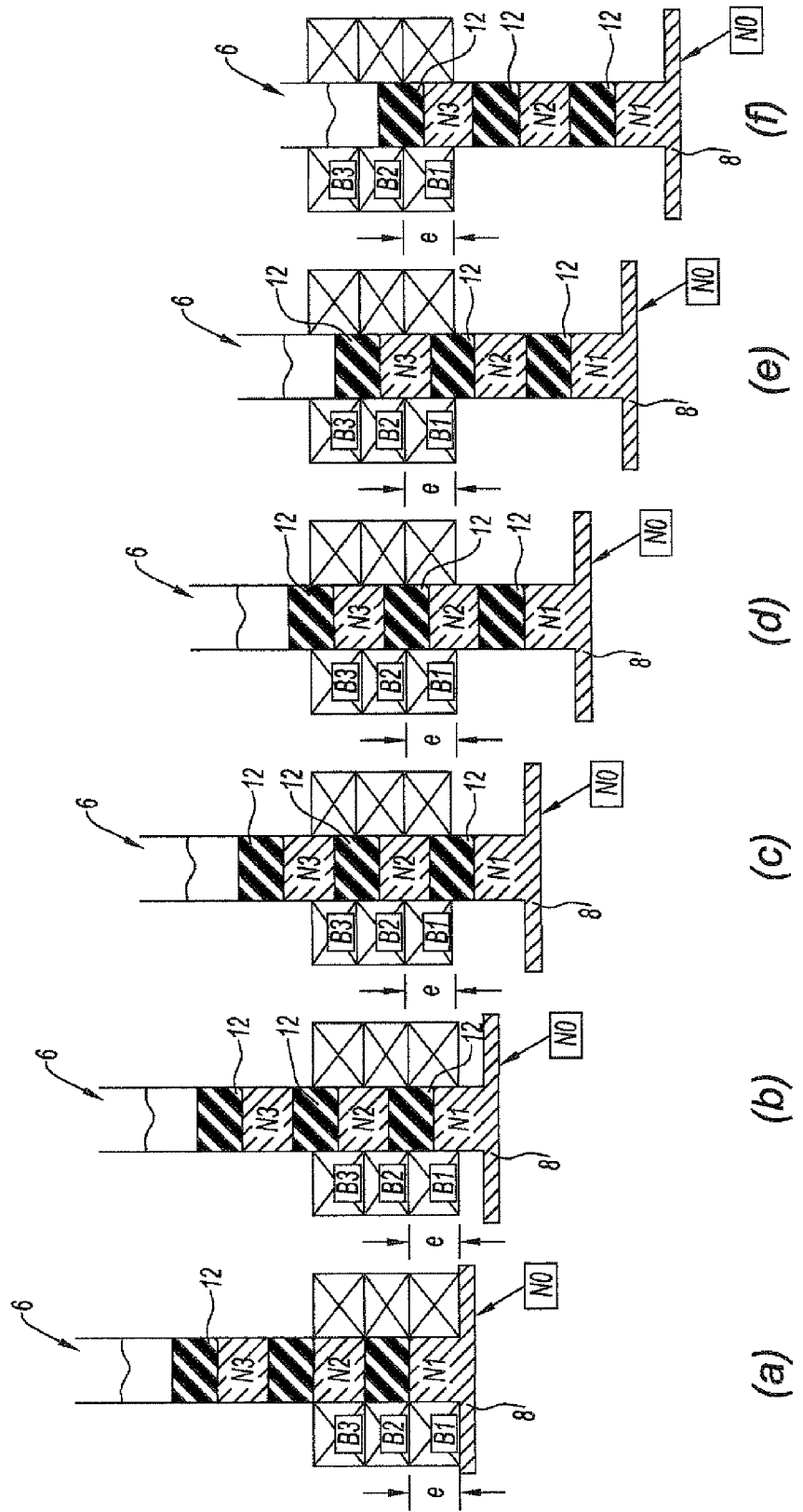
Figure 6:
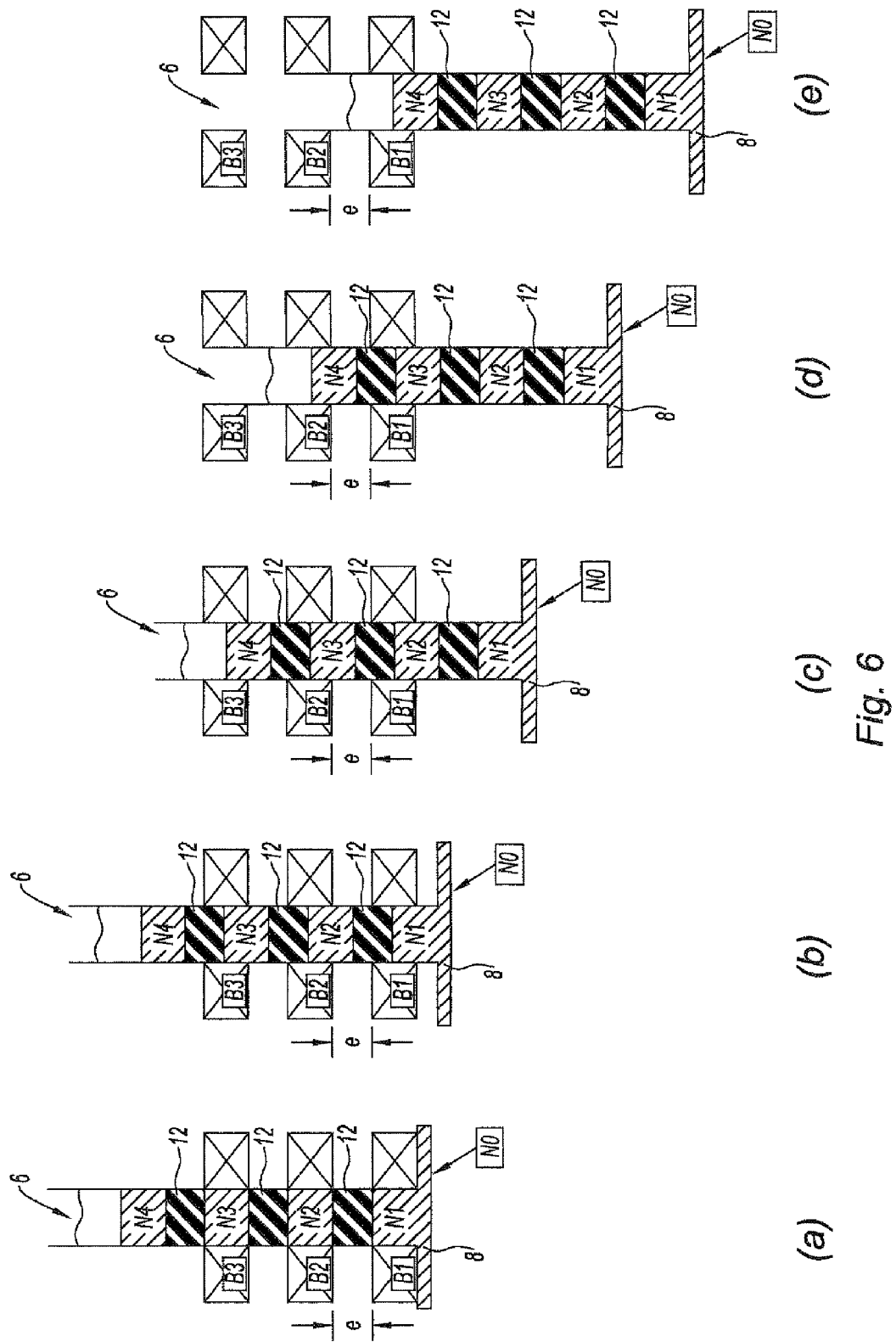
Figure 7:
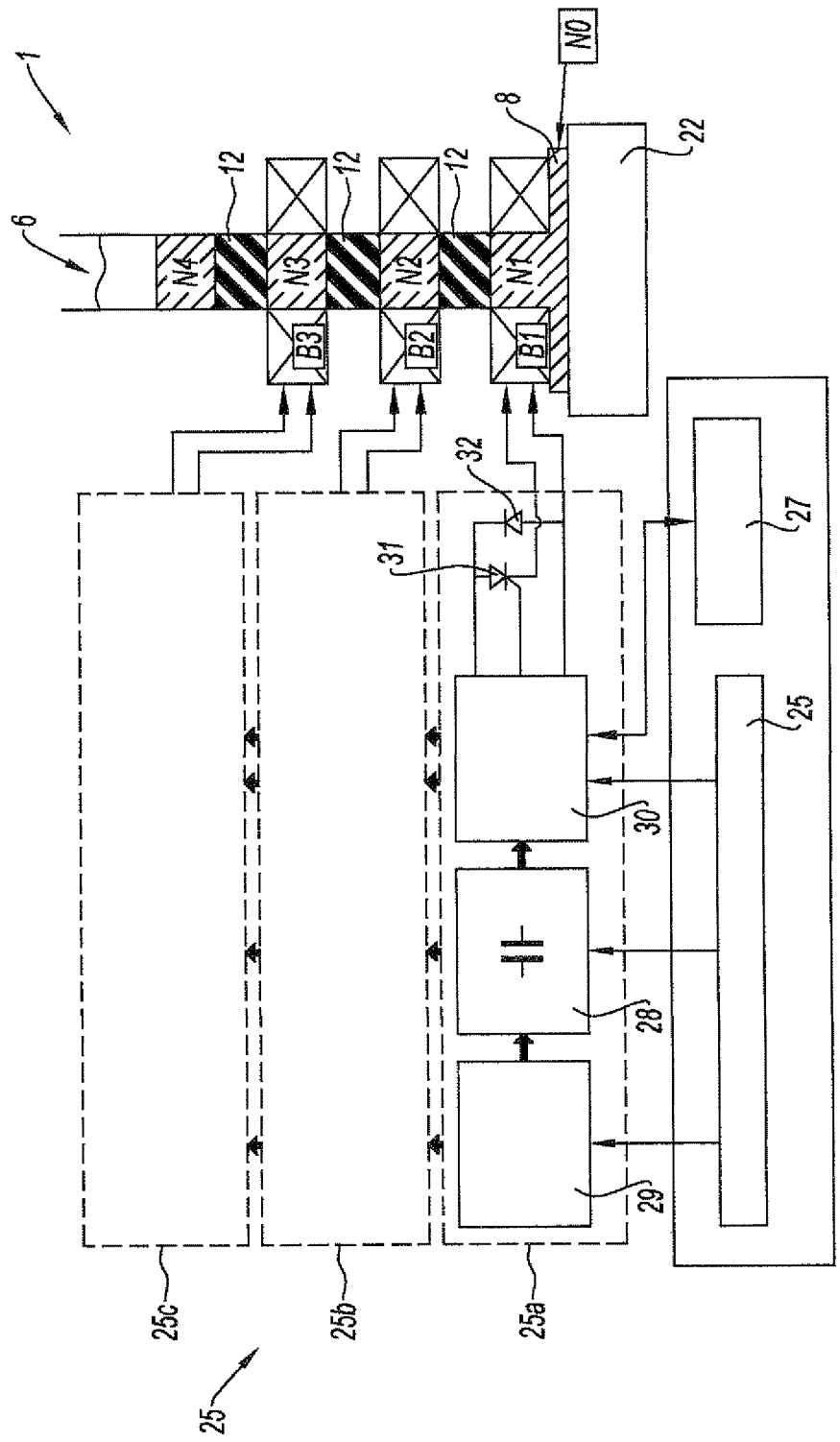

FIG. 2 schematically illustrates an application of the drive device according to the invention in an ejection device for an aircraft load;

FIGS. 3 to 6 illustrate the operation of four variants of the drive device according to the invention; and FIG. 7 is a block diagram illustrating the design of an electrical energy supply circuit of the drive device.

FIG. 1 illustrates in a simplified manner a preferred embodiment of a drive device 1 according to the invention. This drive device 1 is designed to act as an electromagnetic accelerator in order to bring about a high-energy magnetic movement pulse and to apply this pulse to a mechanical member O. This member may be of any shape and type, for example, a bar, a plate, etc. and the features thereof are independent from those of the invention, naturally provided that the quantity of movement brought about by the drive device is sufficient to be able to provide the movement which it is desirable to confer on the mechanical member O, taking into account in particular the inertia thereof.

The drive device 1 comprises a mounting 2 which is illustrated schematically and in a divided manner. This mounting may also be of any shape and depends on the environment in which the drive device 1 is used. It is in particular arranged so as to accommodate an electromagnetic coil 3 which is arranged in a cylindrical hole 4 having an axis X-X which is provided therein. The coil 3 is cylindrical with a cross-section which is preferably rectangular and sized in accordance with the features described by Brooks and known to specialists in order to optimise the ratio between the current I sent into the coil and the force F produced (maximum reduction of losses by means of resistivity).

The coil 3 thus delimits a cylindrical sliding passage 5 for a movable piston 6, the cylindrical passage being extended at 7 owing to the shape of a portion of the mounting 2 in order to correctly guide the piston during its movements.

The movable piston 6 preferably comprises a pushing element 8 which forms the head of the piston and a shank 9. In the embodiment illustrated in this instance, the pushing element 8 is in the form of a plate, for example, of rectangular shape. Generally, the pushing element will have a shape which is adapted to that of the mechanical member O which must receive the movement pulse.

In the rest position of the assembly, this plate 8 is pressed against the front face of the coil 3 under the action of a return means of the piston 6. In the variant described, this return means is of the resilient type, such as at least a spring 10, which is fitted between the rear end of the shank 9 of the piston 6 and an appropriate part of the mounting 2. However, this design of the return means is not limiting for the invention.

The shank 9 of the movable piston 6 is composed of a stack of alternating blocks of sizes which are preferably identical to each other and to the size of the central passage 5 delimited by the coil 3. A first 11 of these blocks is fixedly joined to the pushing element 8, preferably produced integrally therewith, and is composed of a material which has paramagnetic susceptibility. In the case illustrated, this material is electrically conductive, for example, of metal such as aluminum, hard aluminum, DURAL, ZICRAL or magnesium.

The first block 11 is in turn fixedly joined to a second block 12 of insulating material, for example, of glass fibres or a plastics material, such as DELERIN, PVC or glass fibre. Other blocks 11 and 12, which are alternately conductive and insulating, then follow as far as the end of the shank 9 opposite the pushing element or plate 8. The number of alternating blocks is selected in accordance with the duration and the acceleration energy which it is desirable to impose on the mechanical member O.

The coil 3 is supplied with electrical energy by an electrical energy supply device 13 which is capable of bringing about high-energy pulses of an adequate duration and at an adequate rate to bring about the acceleration to be conferred on the mechanical member O. An advantageous embodiment of such an electrical energy supply device will be described below.

FIG. 1A illustrates a variant of the drive device 1 which has been described above. It differs owing to the return means of the piston 6. In this variant, the piston additionally comprises a ferromagnetic plate 14 which is fixed to the rear end of the shank 9. An electromagnetic return coil 15 is fixed to the mounting 2. This will be excited via a control means which is provided in the electrical energy supply circuit 13 when, after an acceleration path, the piston 6 must be returned to its initial position.

The drive device 1 according to the invention operates owing to the repellent force produced by the electrical excitation pulse which is applied to the coil 3 and which brings about Foucault currents in the conductive portions 8 and 11 of the piston. This force is proportional to the intensity of the current which passes through the coil 3 in accordance with the formula:

$$F_{(t)} = K I^2_{(t)}$$

wherein

F Expulsion force

K Constant

I Intensity of the current pulse in the coil 3.

By controlling this current in terms of duration and intensity during each pulse applied, it is possible to determine the acceleration and the length of the ejection path.

The beginning of the path is provided substantially by the force brought about first of all in the plate 8 then progressively in the first conductive block 11. This force is transmitted to the object O to be moved. Successive excitation pulses are then applied to the coil 3 at a predetermined rate, for example, each time an insulating block moves into the coil. When the piston 6 reaches the end of its path, the coil 3 is deactivated and the piston 6 is returned to its initial position, either by the resilient return means 10 (FIG. 1), or by the excitation of the coil 15 acting on the ferromagnetic plate 14 (FIG. 1A).

FIG. 2 schematically illustrates a particularly advantageous application of the invention. There is illustrated an ejection system for a charge or load which is intended to be carried by an aircraft, such as a missile, a bomb, a fuel tank or the like. This system is indicated with the rectangle 20. In a manner known per se, such a system is fixed to a support which is located below the wing of the aircraft by means of a mechanical interface 21. The load 22 is fixed to the ejection system 20 by means of a mechanism 23 which comprises removable hooks which co-operate with support rings which are present on the load 22.

In a manner also known per se, in order to allow the load to take off without any turbulence with respect to the aircraft, it is desirable, at the time of its launch, for a strong movement pulse to be applied to it in order to separate it abruptly from its support. To this end, it is known to use ejection mechanisms which are either pyrotechnic or pneumatic. Although these mechanisms have advantages, they involve disadvantages which it would be desirable to overcome. In particular, they are relatively heavy and require complex logistics (replacement of explosive cartridges or bottles of compressed gas, for example). It has been found that an ejector which is provided with a drive device according to the present invention meets this demand in a remarkable manner and in particular simplifies the logistics since it does not use any consumable product.

For this reason, the ejection system of FIG. 2 comprises such a drive device indicated in this instance schematically with the rectangle 1. The coil 3 of this drive device is connected to electrical energy supply means 24 which are in turn connected to the on-board electrical system 25 of the aircraft by a connector 26 which also transmits the ejection control signal from the on-board systems 27 which control the use of the loads of the aircraft.

According to the above description, it can be seen that the drive device 1 according to the invention acts as a linear step motor, the piston being able to be moved in both directions along the axis X-X in accordance with the electrical control of the coil 3 and/or the return means 10 or 14, 15.

Four specific embodiments of the drive device according to the invention in which at least one coil is provided will now be described, the current(s) passing through the coils being controlled in accordance with a specific sequence in each case.

It should be noted that these embodiments are only examples of the numerous possibilities offered to the designer in the context of the invention for producing a drive device which meets the specific requirements of the application envisaged. In the context of the application for expulsion of a load from an aircraft, however, it has been found that the embodiment of FIG. 6 with the associated current control sequence thereof is particularly advantageous.

In order to facilitate understanding of the operation of the drive devices of FIGS. 3 to 6, the conductive blocks 11 have been designated N followed by its sequential number in the piston 6 concerned counting from the pushing element 8. This is designated each time with the reference N0.

The coils 3 are designated B followed by their sequential number in the stack which they constitute, if necessary, in the drive device 1, the one designated B1 being the closest to the pushing element 8. The insulating blocks have not been given any reference other than that of their reference numeral 12 already used in the description of the FIGS. 1 and 1A.

Furthermore, conventionally, it should be noted that each time a coil is excited by a current pulse, the piston 6 moves by a distance which is equal to or which is a multiple of half the height e of a coil.

Figure 3:
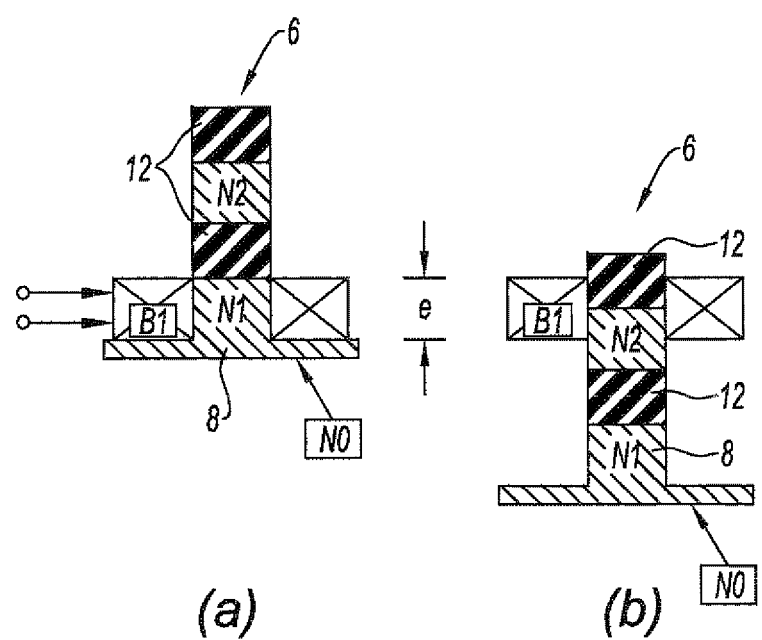

In this manner, according to FIG. 3, the drive device 1 comprises two blocks or cores N1 and N2, two insulating blocks 12 and a single ejection coil B1. This is placed in a position adjacent to the pushing element 8 or N0, when the drive device 1 is in the rest state.

The control of this drive device 1 is carried out in two successive phases 1 and 2, during which the piston 6 carries out two steps, phase 1 corresponding to a step of 2.5e and phase 2 corresponding to a step of 0.5e. During each of the phases 1 and 2, a pulse of current is applied to the coil B1. FIG. 3 illustrates at a) and b), respectively, the rest position of the drive device 1 and the final position after the two phases are complete. Table 1 below sets out the operations which take place during all the phases.

TABLE 1

| Phase | B1 | Path |
|---|---|---|
| a | N0 + N1 | 2.5e |
| b | N2 | 0.5e |
| Acceleration path | | 3e |

When phase 2 is complete, the drive device 1 controlled in this manner will have carried out two ejection steps for a total path of 3e. As already indicated, the power and the acceleration of ejection depend substantially on the value and the shape of the current pulse applied to each coil during the phase in question.

Figure 4:
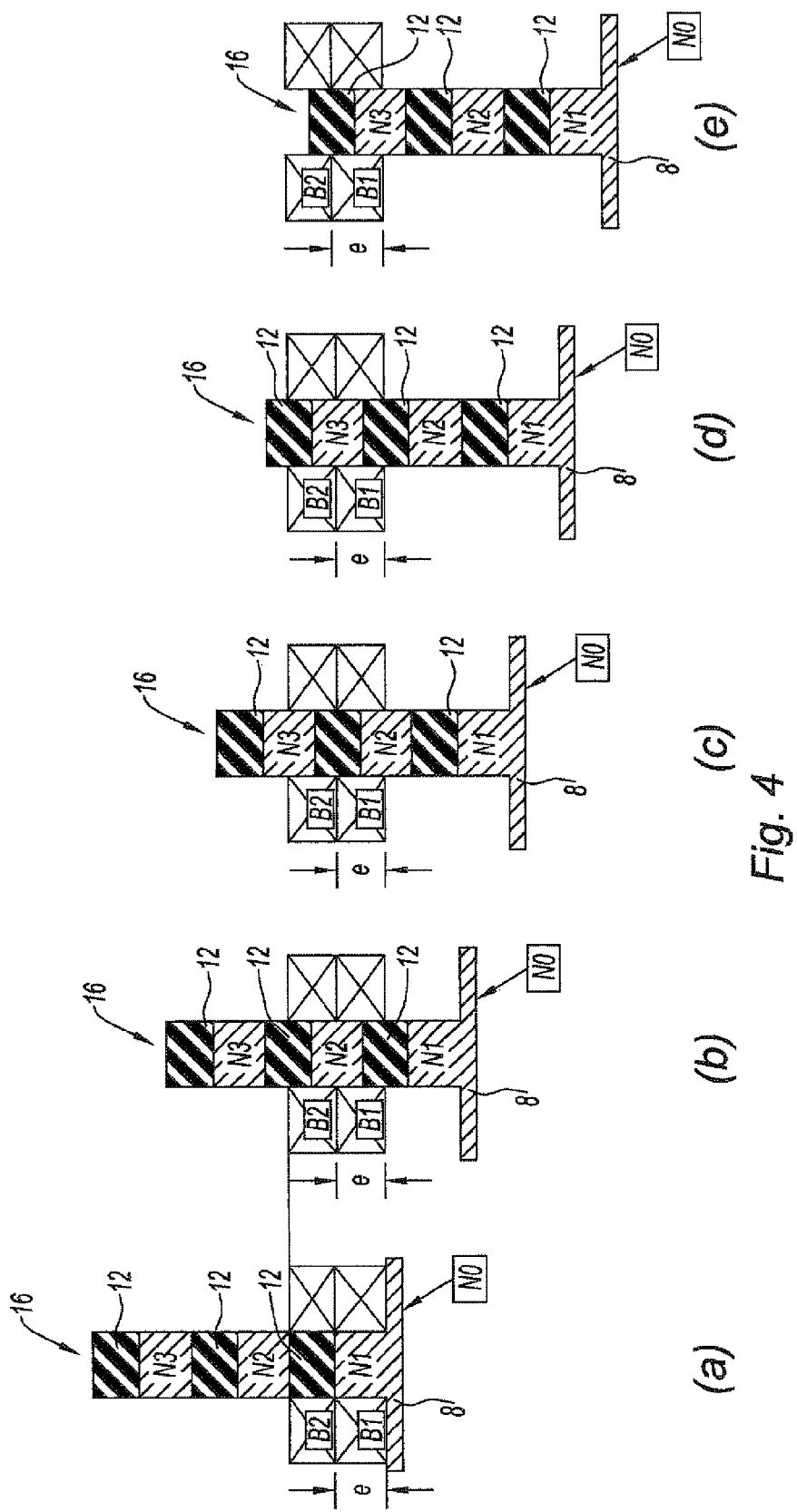

In the embodiment of FIG. 4, the drive device 1 comprises two coils B1 and B2, placed one on top of the other, whilst the piston 6 comprises three conductive blocks N1 to N3 in alternation with three insulating blocks 12. In this instance, the total path of the drive device is 5e travelled in five phases, the first of which moves the piston 6 by a distance of 1.5e. The following table can thus be set out for the control sequence of the coils B1 and B2.

TABLE 2

| Phase | B1 | B2 | Path |
|---|---|---|---|
| a | N0 + N1 | | 1.5 |
| b | | N2 | e |
| c | N2 | | e |
| d | | N3 | e |
| e | N3 | | 0.5 |
| Acceleration path | | | 5e |

In the embodiment of FIG. 5, the drive device 1 comprises three coils B1, B2 and B3, which are stacked one on top of the other, whilst the piston 6 comprises three conductive blocks N1 to N3 in alternation with three insulating blocks 12.

In this instance, the total path of the drive device is 5.5e travelled in six phases, the first of which moves the piston by a distance of 0.5e and the other phases by e. The table below can thus be produced for the control sequence of the coils B1 and B2 to B3.

TABLE 3

| Phase | B1 | B2 | B3 | Path |
|---|---|---|---|---|
| a | N0 + N1 | | | 0.5 |
| b | N1 | | N2 | e |
| c | | N2 | | e |
| d | N2 | | N3 | e |
| e | | N3 | | e |
| f | N3 | | | e |
| Acceleration path | | | | 5.5e |

As indicated schematically in FIG. 5, the length of the piston 6 can be increased with an alternating sequence of paramagnetic and insulating blocks, which allows its path to be increased further. It is then necessary to add control phases for the coils B1 to B3 which each allow the piston 6 to be moved by a step having a length e.

In some cases, in order to optimise the yield of the intensity of the current in the coils by the repellent force obtained, it may be advantageous to space apart the coils, for example, by interposing between them cross-members which are neutral from a magnetic point of view (not illustrated in the Figures) or by spacing them apart from each other by a predetermined distance, equal, for example, to two times their height.

An embodiment which complies with this objective is illustrated in FIG. 6. In this instance, the total path will also be 8.5e, whilst the piston 6 in this instance must comprise four conductive blocks N1 to N4 and three insulating blocks 12. The control sequence of this embodiment results from the following table:

TABLE 4

| Phase | B1 | B2 | B3 | Path |
|---|---|---|---|---|
| a | N0 + N1 | | | 0.5e |
| b | N1 | N2 | N3 | 2e |
| c | N2 | N3 | N4 | 2e |
| d | N3 | N4 | | 2e |
| e | N4 | | | 2e |
| | Acceleration path | | | 8.5 |

As can be seen, the path is travelled by means of five control phases of the coils. Also in this instance, using an extension of the piston 6 with blocks which are alternately paramagnetic and insulating, it is possible to extend the acceleration path.

FIG. 7 illustrates in greater detail the electrical energy supply means 25 of FIG. 2 when the configuration having three coils is used in accordance with FIG. 6.

It is possible to see in FIG. 7 the coils B1, B2 and B3 and the piston 6 of the drive device 1 of FIG. 6 and the on-board electrical energy supply system 25 and the system 27 which controls the load, already illustrated in FIG. 2.

The electrical energy supply means 25 comprise three identical sections 25a to 25c which are associated with each of the coils B1, B2 and B3, respectively. If the drive device 1 comprises a number of ejection coils other than 3, a number of supply sections will be provided which is equal to the number of coils used.

Each section 25a to 25c comprises an energy storage capacitor 28, a charge circuit 29 for this capacitor, a control circuit 30 for the associated coil, a semi-conductive power commutator 31 which is controlled by the control circuit 30 and an anti-return diode 32. The components 30, 31 and 33 are supplied and controlled by the systems 27 of the aircraft.

If the drive device comprises a magnetic return plate, as illustrated at 14 in FIG. 1A, an additional energy supply section (not illustrated) similar to the sections 25a to 25c will be provided with characteristics adapted to the coil 15.

It should be noted that, according to one variant of the invention, it is also possible to return the piston 6 to its initial position by means of an appropriate control which is the reverse of those described in the tables set out above.

The invention claimed is:

1. Drive device which is intended to apply a high-energy magnetic movement pulse to a mechanical member in order to apply acceleration thereto, comprising:
a mounting,
at least one electromagnetic coil which is fixed in this mounting and which has an axis of revolution and a central passage which is centered relative to this axis,
a piston which has at least a portion made of a material having paramagnetic susceptibility, the piston being mounted in a sliding manner in the passage and placed in contact with the mechanical member when the drive device is in the rest state, and
electrical energy supply means for the coil, which means are provided in order to store electrical energy and to abruptly release this energy into the coil and thus apply the high-energy magnetic movement pulse to the mechanical member, wherein
the piston comprises a stack of blocks having a peripheral shape which is adapted to that of the passage, the blocks in the stack being made alternately from the material having paramagnetic susceptibility and an insulating material; and
the electrical energy supply means are provided in order to allow the energy to be applied to the coil in the form of a series of electrical pulses which appear as the piston moves.

2. Drive device according to claim 1, wherein the material having paramagnetic susceptibility is of the electrically conductive type.

3. Drive device according to claim 1, wherein a pushing member, for example, in the form of a plate, is fixedly joined to the stack of blocks and interposed between the stack and the mechanical member when the drive device is in the rest position.

4. Drive device according to claim 1, comprising a return means in order to return the piston into the initial position thereof after the movement pulse applied to the mechanical member is complete.

5. Drive device according to claim 4, wherein the return means comprises a resilient return element which is formed by at least one spring which is tensioned between the mounting and the rear end of the piston.

6. Drive device according to claim 4, wherein the return means comprises a plate of ferromagnetic material which is fixed to the rear end of the piston and an electromagnetic coil which is provided on the mounting and which is intended, when it is excited, to attract the plate in order to return the piston to its initial position.

7. Drive device according to claim 1, comprising at least two electromagnetic coils which are aligned axially relative to the axis and through which the piston extends, and wherein the electrical energy supply means comprise for each of the coils a supply section which is provided in order to store electrical energy and to abruptly release this energy into the associated coil, the electrical pulses being applied by these sections in a predetermined order of sequence.

8. Drive device according to claim 7, wherein the coils are superimposed one on the other or are spaced-apart from each other by a distance corresponding to at least a height of the blocks.

9. Drive device according to claim 1, wherein the electrical energy supply means comprise at least one capacitor for storing the electrical energy and semi-conductive control means to release this energy at the correct time during the ejection process.

10. Ejection device for an aircraft load which comprises a drive device according to claim 1, and whose piston, prior to the take-off of the load from the aircraft, is in contact with the load which thereby forms the mechanical object in order to be subjected to the high-energy movement pulse, and wherein the electrical energy supply means are connected to the control systems of the load of the aircraft in order to be triggered at the time when the take-off of the load must be initiated.

* * * * *